United States Patent
Morent et al.

(10) Patent No.: US 11,993,916 B2
(45) Date of Patent: May 28, 2024

(54) OPERATING ELEMENT AND MANUFACTURING METHOD FOR AN OPERATING ELEMENT

(71) Applicant: elobau GmbH & Co. KG, Leutkirch (DE)

(72) Inventors: Florian Morent, Leutkirch (DE); Martin Walter, Bad Wurzach (DE)

(73) Assignee: ELOBAU GMBH & CO. KG, Leutkirch (DE)

( * ) Notice: Subject to any disclaimer, the term of this patent is extended or adjusted under 35 U.S.C. 154(b) by 0 days.

(21) Appl. No.: 17/895,261

(22) Filed: Aug. 25, 2022

(65) Prior Publication Data
US 2023/0064670 A1 Mar. 2, 2023

(30) Foreign Application Priority Data
Aug. 27, 2021 (DE) .................... 10 2021 122 292.3

(51) Int. Cl.
*E02F 9/20* (2006.01)
*B60R 16/02* (2006.01)
*G05G 9/047* (2006.01)

(52) U.S. Cl.
CPC ........ *E02F 9/2004* (2013.01); *B60R 16/0215* (2013.01); *E02F 9/2058* (2013.01); *G05G 9/047* (2013.01)

(58) Field of Classification Search
CPC ............ G05G 9/047; G05G 2009/0474; E02F 9/2004; E02F 9/2058; B60R 16/0215
See application file for complete search history.

(56) References Cited

U.S. PATENT DOCUMENTS

| | | | | |
|---|---|---|---|---|
| 3,800,615 A | * | 4/1974 | Pilch ..................... | E02F 9/2004 74/471 XY |
| 4,748,441 A | * | 5/1988 | Brzezinski ............. | G05G 9/047 345/161 |
| 5,002,241 A | * | 3/1991 | Tizac .................. | B64C 13/0421 244/237 |

(Continued)

FOREIGN PATENT DOCUMENTS

| | | |
|---|---|---|
| EP | 0032883 A2 | 7/1981 |
| EP | 0536174 B1 * | 1/1995 |

(Continued)

*Primary Examiner* — Adam D Rogers
(74) *Attorney, Agent, or Firm* — Dickinson Wright PLLC (57) ABSTRACT

An operating element for operating a machine by an operator in which control lines for connecting the control lever with a control unit in at least a paired design is provided. A first wiring harness and a second wiring harness run along the control lever to the receptacle. The first wiring harness runs from a first starting point to the receptacle and the second wiring harness runs from a second starting point to the receptacle. The first starting point and second starting point are arranged at a distance from the receptacle. The first wiring harness at a first connection point is connected to the receptacle, and the second wiring harness at a second connection point is connected to the receptacle. The first and the second connection point are arranged separately from each other on a straight connecting line, and the connecting line runs through a central axis of the control lever.

13 Claims, 5 Drawing Sheets

(56) References Cited

U.S. PATENT DOCUMENTS

| | | | | |
|---|---|---|---|---|
| 5,934,324 A * | 8/1999 | Bessard | ................ | G05G 9/047 |
| | | | | 137/636.1 |
| 6,450,278 B1 * | 9/2002 | Shirogami | ............ | E02F 9/2004 |
| | | | | 180/89.18 |
| 6,865,342 B2 * | 3/2005 | Hirata | ................... | G05G 9/047 |
| | | | | 396/85 |
| 7,601,924 B2 * | 10/2009 | Demirtas | ............... | G05G 9/047 |
| | | | | 200/6 R |
| 7,753,078 B2 * | 7/2010 | Bertolasi | ............... | G05G 9/047 |
| | | | | 137/557 |
| 8,979,175 B2 * | 3/2015 | Kim | ................... | B62D 33/0617 |
| | | | | 296/190.04 |
| 9,355,756 B2 * | 5/2016 | Gundel | ............... | H01B 7/0838 |
| 10,281,949 B2 * | 5/2019 | Kuroda | ................. | G05G 9/047 |
| 2003/0007798 A1 | 1/2003 | Hirata et al. | | |
| 2017/0090506 A1 | 3/2017 | Kuroda et al. | | |

FOREIGN PATENT DOCUMENTS

| | | | | |
|---|---|---|---|---|
| EP | 1571266 A1 * | 9/2005 | ........... | B60N 2/3031 |
| EP | 2078999 A2 | 7/2009 | | |
| JP | 2002251221 A | 9/2002 | | |
| KR | 920000896 Y1 * | 1/1992 | | |
| WO | 9119046 A1 | 12/1991 | | |

* cited by examiner

OPERATING ELEMENT AND MANUFACTURING METHOD FOR AN OPERATING ELEMENT

This U.S. patent application claims the benefit of German Patent Application No. DE 10 2021 122 292.3, filed Aug. 27, 2021, the entire contents of which are incorporated herein by reference for all purposes.

BACKGROUND

1. Technical Field

The present invention relates to an operating element for controlling a machine, such as an industrial plant or a vehicle, in particular, an excavator, a manufacturing method for the production of the presented operating element and a machine, such as an excavator, which comprises the presented operating element.

2. Related Art

Operating elements used for machine control in the form of control levers usually comprise a housing in which a control lever, which can be moved, in particular, pivotably mounted around a pivot point or two gimbal axes relative to the housing, and a mechanism acting between the housing and the control lever are arranged. The mechanism influences the actuating torques required for pivoting the control lever from a resting position or initial position to a deflected position and usually provides a return torque for returning the control lever from a deflected position to the resting position or initial position.

Operating elements for machine control should be compact and ergonomic. In particular, operating elements for machine control should be particularly robust for use in industrial environments, such as on construction sites, in order to enable a long service life.

SUMMARY

The presented invention serves, in particular, to provide an operating element that enables an intuitive and exact operation of a machine and minimizes fatigue or overuse of a machine's operator.

Thereby, an operating element for operating a machine by an operator is presented in accordance with a first aspect of the present invention. The operating element comprises a control lever swivel-mounted around a pivot point, a plurality of control lines for connecting the control lever to a control unit and a receptacle for picking up the control lines. Respective control lines of the plurality of control lines run in at least a paired design consisting of a first wiring harness and a second wiring harness along the control lever to the receptacle, wherein the first wiring harness runs from a first starting point to the receptacle and the second wiring harness runs from a second starting point to the receptacle.

The first starting point and the second starting point are arranged at a distance from the receptacle. The first wiring harness is connected to the receptacle at a first connection point and the second wiring harness is connected to the receptacle at a second connection point. The first connection point and the second connection point are arranged separately from each other on a straight connecting line, wherein the connecting line runs through a central axis of the control lever.

According to the invention, an operating element is understood as an element for operating or controlling a machine. In particular, an operating element is used to enter control commands into a machine. For this purpose, the operating element can be designed, for example, as a so-called "joystick." In order to transmit the control commands to the machine, the presented operating element includes control lines that can be connected to the machine directly or via a coupling element, such as a valve, a computing unit, or an interface.

A wiring harness is understood, in the context of the presented invention, as a plurality, in particular, a multitude of control lines, which is or are surrounded by a common sheathing. For example, a wiring harness may comprise a plurality of electrical lines or cables, which may also be surrounded by a plastic sleeve, but also a ribbon cable is understood according to the invention as a wiring harness, as well as hydraulic or pneumatic lines.

Under a central axis of a control lever is to be understood in the context of the presented invention an axis that runs vertically, i.e., in particular, from an upper end in the direction of gravity to a lower end of the control lever in the direction of gravity through it. Depending on the shape of the control lever, the central axis runs in the centre point, i.e., in particular, through a centre of a cylindrical part of the control lever, through the control lever. On the control lever, a user interface can also be arranged in the form of a grip area, wherein the user interface can comprise, among other things in this, operating elements in addition to the grip area, which are designed, for example, as buttons, switches or control panels for entering control commands. Accordingly, the control lever can be moved by means of the user interface—the grip area—wherein the operating elements are also moved. The user interface can be made of plastic and have an ergonomic shape.

The control lever can preferably be pivoted at two axes or two-dimensionally around the pivot point of the presented operating element. The central axis can be a virtual auxiliary axis or a physical axis, for example, made of metal or plastic.

The invention understands by a receptacle a firmly positioned or firmly element that can be positioned, such as a frame, on which the control lines provided for according to the invention are to be arranged and be accordingly secured in a fixed position. Accordingly, the control lever can be moved relative to the receptacle.

Connection points are provided on the presented operating element for arranging or picking up the control lines. A connection point can comprise one or a plurality of mechanical interfaces, such as clamping elements, at which respective control lines or line assemblies can be arranged directly or by means of a mating interface, such as a counter-clamping element.

In particular, a mechanical interface for arranging or picking up the control lines provided for according to the invention can comprise a mechanical spring element which deforms reversibly or elastically when arranging the control lines at the mechanical interface and provides a clamping force for securing of the control lines in a fixed position at the receptacle.

The operating element according to the invention is based on the principle that the control lines of the operating element are divided into paired line assemblies. Accordingly, at least two line assemblies run from respective starting points at the control lever provided for according to the invention to respective connection points at the receptacle provided according to the invention.

Since control lines, in particular, the control lines combined into line assemblies, provide a mechanical resistance in the event of a movement, mechanical-resistance forces or torques counteract this movement via the control lines. In order to achieve an even distribution of the torques or forces acting on the control lines on the control lever, the control lines are divided into paired line assemblies, which, according to the invention, are connected to the receptacle of the operating element at respective connection points in such a way that the first connection point and the second connection point are separated from each other on a straight connecting line, wherein the connecting line runs through a central axis of the control lever. In particular, the first connection point and the second connection point are located on opposite sides of the central axis. This connecting line can run over, below or through the pivot point.

Due to the distanced arrangement of the connection points, i.e., the first connection point and the second connection point on the connecting line, the torques or forces acting on the control lever via the two line assemblies are divided and, in particular, evenly distributed. Accordingly, the respective torques or forces of the respective line assemblies balance each other or compensate for each other so that, when the control lever moves; a one-sided application of torque on the control lever and a resulting deflection from a specified trajectory or expected by a user, or different offsets of the axes are avoided.

Accordingly, the application of torque onto the control lever from a single side is constant or minimal so that a movement of the control lever can be very intuitive or be very predictable for a user.

In particular, the distanced arrangement of the connection points on the connecting axis provided for according to the invention causes a tensile force acting from the first wiring harness onto the control lever to be opposed by a tractive force acting from the second wiring harness on the control lever so that the tensile forces balance each other out and the control lever can be moved in a particularly precise manner. The same applies analogously to cancelling compressive forces, if they occur.

Due to the balancing effect of torques acting via the paired line assemblies, a particularly great multitude of control lines can be arranged in the operating element so that even complex circuits or control assemblies can be implemented without operational haptics or the precision of the operating element deteriorating with relation to simple circuits or control assemblies.

In particular, the division of the control lines into paired line assemblies requires a smaller cross-section of the respective line assemblies with relation to a design with a single wiring harness so that the respective line assemblies can have a smaller minimum bend radius than a single wiring harness, with the same number of available signals or functions.

Furthermore, the division of the control lines of the presented operating element into paired line assemblies enables operation of the presented operating element with lower torque tolerances or a more precise control setting with relation to a design with a single wiring harness.

Furthermore, by dividing the control lines of the presented operating element into paired line assemblies, material fatigue, such as strand breaks, with relation to a design with a single wiring harness is minimized and, accordingly, a service life of the presented operating element is maximized.

In embodiment of the presented invention, it is provided that the first wiring harness and the second wiring harness run spirally around the central axis of the control lever, wherein the first wiring harness and the second wiring harness according to the invention either differ in their respective sense of rotation or have the same sense of rotation, which is preferred. A spiral or helical course of the first wiring harness and the second wiring harness around the central axis of the control lever, in which the first wiring harness and the second wiring harness differ in their sense of rotation or run in different directions of rotation, causes a corresponding progression of torques acting on the control lever via the first wiring harness and the second wiring harness when the control lever moves. In particular, the first wiring harness and the second wiring harness form two cylindrical spirals or helices that balance each other. For this purpose, the spirals or helices can be mirrored, in particular, by 180°, and accordingly have a stabilizing effect on the control lever. In particular, the first and the second line assemblies run spirally and symmetrically to each other around the central axis of the control lever, which thus forms a symmetry axis. The spiral-shaped course of the two line assemblies around the central axis of the control lever means that their length is greater than the corresponding axial length of the control lever, which is particularly moveable since the line assemblies can easily follow its movements. In this way, material fatigue due to frictional contact between a wiring harness and a bellows surrounding the control lever is avoided and the service life of the device is extended. With the same sense of rotation running line assemblies are also according to the invention and preferred, since they are, for example, easier to mount and less strongly influenced on a spatial level.

In the embodiment of the presented invention, it is provided that the centre axis runs between an upper end and a lower end of the control lever and through the pivot point. Depending on the shape of the control lever, the orientation and position of the centre axis can vary, wherein the centre axis, in particular in a resting position or initial position of the control lever, essentially runs vertically through the control lever and connects the pivot point, in particular, to the upper end of the control lever.

In embodiment of the presented invention, it is provided that the connecting line runs through the pivot point.

A central axis running through the pivot point of the presented operating element requires that the first connection point and the second connection point are in the Z direction at the level of the pivot point so that the pivot point is particularly force-neutral or is exposed to particularly little deflecting torque since the forces impacting the connection point thus have no distance in the Z direction to the pivot point. According to the invention, however, an arrangement of the two connection points in the Z direction is also above or below the pivot point, but preferably again at the same Z-value.

In the embodiment of the invention presented, it is provided that the control lines comprise electrical cables, pneumatic lines and/or hydraulic lines. Depending on the type of machine to be controlled, the operating element presented can include different types of control lines. In particular, pneumatic or hydraulic control lines, which have a thicker wall than electrical cables and which, for example, are connected to a directional valve, show considerable mechanical resistance during operation so that the presented operating element is particularly favourable for direct pneumatic or hydraulic connection.

In embodiment of the invention presented, it is provided that the first starting point and the second starting point are arranged at a distance on a starting point line connecting the first starting point and the second starting point, wherein the starting point line runs through the centre axis of the control lever. In particular, the first starting point and the second starting point are spaced apart from each other on the starting point line in such a way that they are arranged on opposite sides of the central axis. The first starting point and the second output point are, for example, points at which respective control lines emerge from a user interface connected to the control lever of the presented operating element. Alternatively, the first starting point and the second output point can be within the user interface. The first and the second line assemblies can merge into a spiral-shaped design at the first or second starting point, each with the same output angle. Alternatively, the first wiring harness and the second wiring harness can merge into a spiral-shaped design at different output angles so that, for example, an opposing sense of rotation with relation to the first wiring harness to the second wiring harness is forced. For this purpose, for example, a first guide can be arranged at the first starting point, which leads the first wiring harness in a first sense of rotation to the first connection point and at the second starting point a second guide is arranged, which leads the second wiring harness in a second sense of rotation opposing the first sense of rotation with relation to the second connection point.

In the embodiment of the invention, it is provided that a torque acting via the first wiring harness on the control lever corresponds to a torque acting on the control lever via the second wiring harness, so that respective torques acting on the control lever are compensated by the control lines. The associated benefits have already been described. In particular, with a different composition of the first and the second wiring harness, a course of the first and/or the second wiring harness is changed according to the invention so that the torque differences balance each other. For this purpose, in particular, the first wiring harness on the connecting axis may be arranged closer to the centre axis than the second wiring harness.

In embodiment of the invention presented, it is provided that the first wiring harness comprises a plurality of electrical control lines, which are preferably encased together with a single common sheathing, and the second wiring harness comprises a variety of electrical control lines, which are preferably sheathed together with a single common sheathing. Via a plurality of, in particular, two separate line assemblies, each comprising a number of control lines and protecting them against environmental influences by means of a respective sheathing, a mechanical load acting on the control lever of the presented operating element can be reduced with relation to a single wiring harness since several line assemblies with a small cross-section provide significantly less mechanical resistance or counterforce when the control lever is moved than a single wiring harness that has a correspondingly large cross-section. According to the invention, however, there are also individual strands of a wiring harness, which together form a wiring harness and do not necessarily have to be arranged in a common sheathing, but instead are either not bundled at all or only bundled once or a plurality of times across short axial sections. A ribbon cable would also be according to the invention. With regard to the hydraulic or pneumatic control lines, these then form a wiring harness within the meaning of the invention, even if this comprises only a single control line.

In the embodiment of the presented invention, it is provided that the first wiring harness is longer than a first line between the first starting point and the first connection point, and the second wiring harness is longer than a second line between the second starting point and the second connection point. This provides a line reserve for a movement of the control lever, so that the control lever can move in particular two axes without increasing any mechanical resistance to the movement of the control lever through the line assemblies.

In a second aspect, the presented invention relates to a manufacturing method for the production of an operating element. The manufacturing method includes a providing step in which a control lever pivotably mounted around a pivot point, a plurality of control lines for connecting the control lever to a control unit and a receptacle for picking up the control lines are provided. Furthermore, the manufacturing method comprises a connection step in which respective control lines of the plurality of control lines are laid in at least a paired design consisting of a first wiring harness and a second wiring harness in the direction of the receptacle, wherein the first wiring harness is laid from a first starting point in the direction of the receptacle and the second wiring harness is laid from a second starting point in the direction of the receptacle. The first wiring harness is connected to the receptacle at a first connection point and the second wiring harness is connected to the receptacle at a second connection point. The first connection point and the second connection point are arranged at a distance on a straight connecting line and the connecting line runs through a central axis of the control lever.

In a third aspect, the presented invention relates to a machine, in particular, an excavator or tractor with front loader, comprising any one of the embodiments of the presented operating element. The machine may include an operating element, such as an excavator arm, which can be controlled by means of the operating element. To control the control, the control is connected to the operating element. For this purpose, the operating element comprises an interface, such as a plug, which interacts with the mating interface, such as a socket, of the operating element and in particular provides a communicative connection for transmitting control commands.

The invention is described below in a preferred embodiment with reference to the attached drawings by way of example, wherein further advantageous details are to be taken from the figures of the drawings.

DETAILED DESCRIPTION OF EXAMPLE EMBODIMENTS

Figure 1:
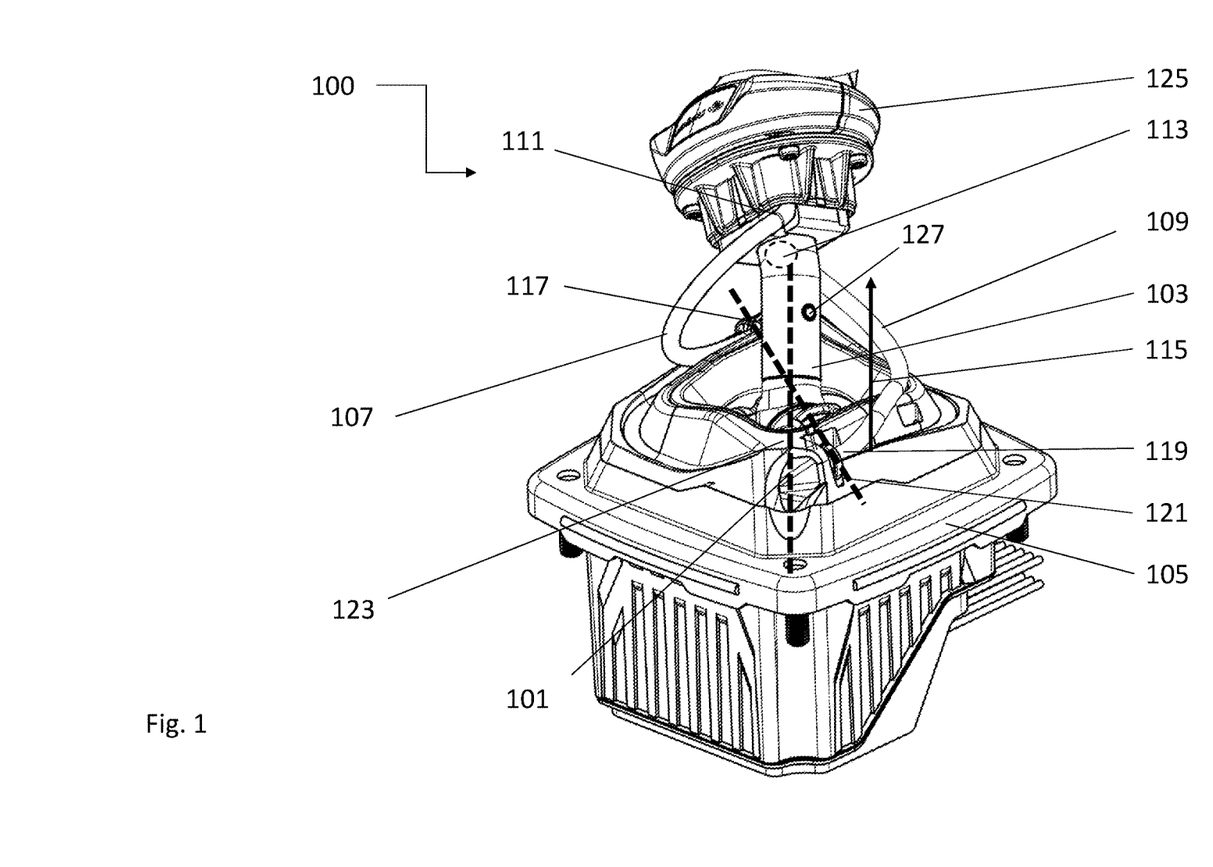
FIG. 1: a schematic illustration of a possible embodiment of the operating element according to the invention.

FIG. 1 shows an operating element 100. The operating element 100 comprises a control lever 103 pivotably mounted around a pivot point 101, a plurality of control lines (not recognizable here) for connecting the control lever 103 with a control unit (not shown here) and a receptacle 105 for picking up the control lines. Respective control lines of the plurality of control lines run in a paired design consisting of a first wiring harness 107 and a second wiring harness 109 along the control lever. Accordingly, the first wiring harness 107 and the second wiring harness 109 each comprise a plurality, in particular a multitude, of control lines.

By dividing the control lines of the operating element 100 into the first wiring harness 107 and the second wiring harness 109, a single wiring harness with a particularly large diameter and correspondingly large mechanical resistance is avoided. Instead, the first wiring harness 107 and the second wiring harness 109 each have a particularly small diameter with a correspondingly small mechanical resistance. For example, 20 control lines can be divided into the first wiring harness 107 and the second wiring harness 109, so that the first wiring harness 107 comprises ten control lines and the second wiring harness 109 another ten control lines.

The first wiring harness 107 runs from a first starting point 111 to the receptacle 105, the second wiring harness 109 from a second starting point 113 to this. The first starting point 111 and the second starting point 113 are arranged at a distance from the receptacle 105, as indicated by arrow 115. The first wiring harness 107 is connected to the receptacle 105 at a first connection point 117. The second wiring harness 109 is connected to the receptacle 105 at a second connection point 119. The first connection point 117 and the second connection point 119 are separated from each other on a straight connecting line 121 which runs through a central axis 123 of the control lever 103. Since the first connection point 117 and second connection point 119 are separated from each other by the central axis, the torques or forces acting on the control lever 103 by the two line assemblies 107, 109 compensate each other, so that a deviation or a so-called "offset" of the control lever 103 from a movement line expected by a user is minimal. In the embodiment shown, the two line assemblies 107, 109 run in the same sense of rotation.

On the control lever 103 a user interface 125 is arranged, the user interface 125 includes a plurality of switches and buttons for transmitting control commands via the control lines to the control unit and, if necessary, also an ergonomically shaped grip section.

Figure 2:
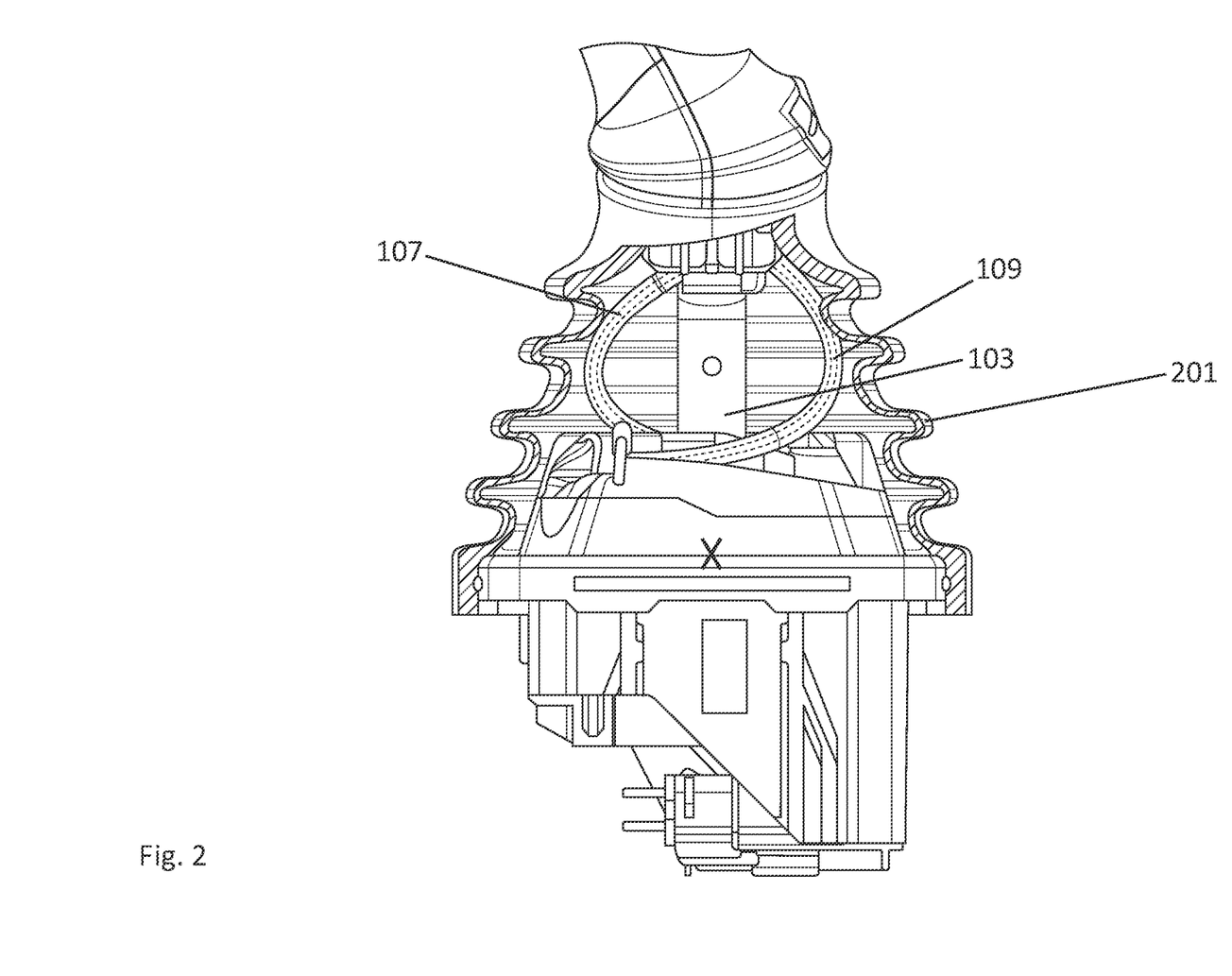
FIG. 2: a further schematic illustration of the operating element from FIG. 1 in a sectional view.

In FIG. 2, in a cut side view of the embodiment, it is clearly visible that the first wiring harness 107 and the second wiring harness 109 each run spiral-shaped, wherein the first wiring harness 107 runs in a sense of rotation that is no different from a sense of rotation in which the second wiring harness 109 runs. Accordingly, a screw line according to which the first wiring harness 107 runs in the same sense as a screw line, according to which the second wiring harness 109 runs. Due to the spiral-shaped curves of the first wiring harness 107 and the second wiring harness 109, a particularly wide movement of the control lever 103, in particular a deflection of 25° in the X direction and/or Y direction is made possible. The line assemblies 107 and 109 take up a small installation space, so that a bellows 201, which surrounds the line assemblies 107 and 109, can be designed very compactly and accordingly even a movement of the control lever 103 only a low mechanical resistance. The upper end of FIG. 2 forms the user interface, the lower one forms the receptacle, each as shown in FIG. 1. The receptacle is also simultaneously designed as a housing for the operating element, with which it is attached, for example, to a vehicle or an arm rest. An "x" indicates the position of the pivot point 101 from FIG. 1, which is located inside the housing, which is not visible here.

Figure 3:
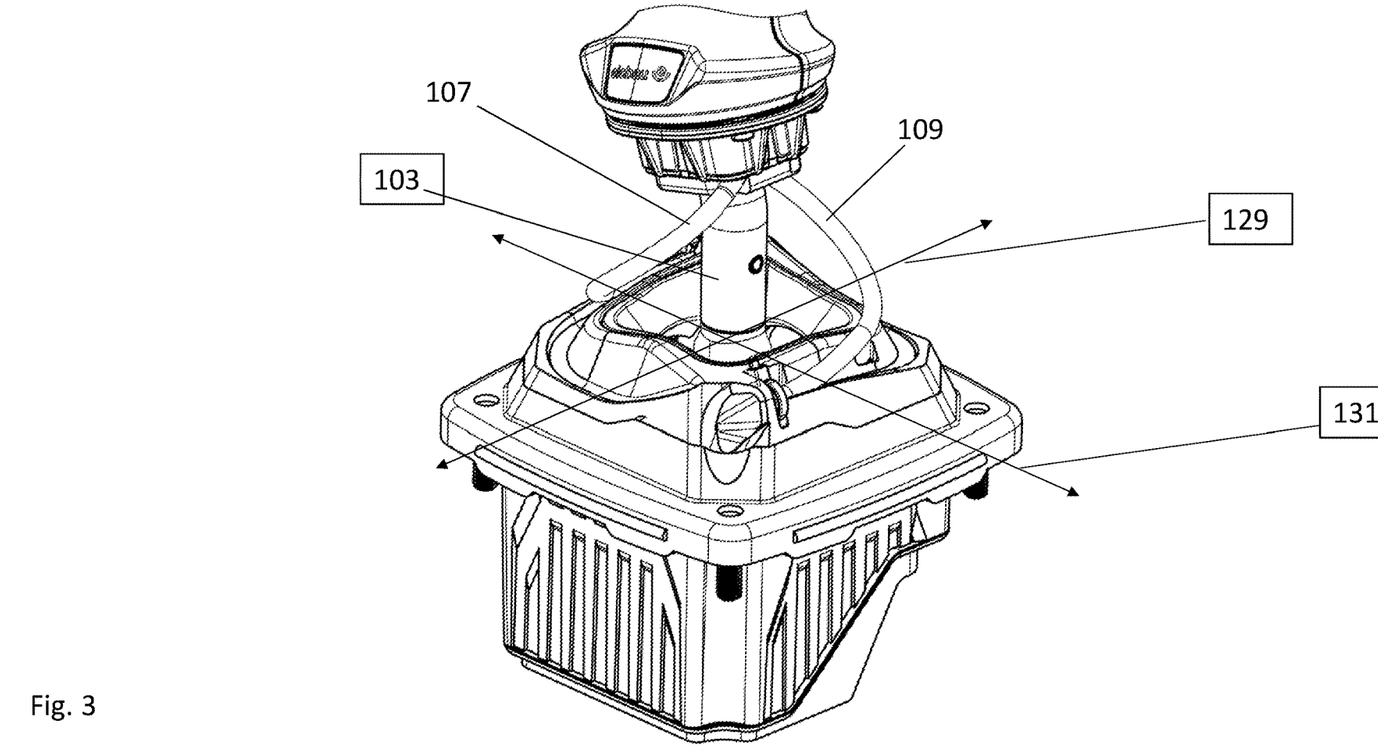
FIG. 3: yet another schematic illustration of the operating element from FIG. 1, FIG. 4: a schematic illustration of a possible embodiment of the manufacturing method according to the invention.

FIG. 3 schematically shows an X-axis 129 and a Y-axis 131 of a field of motion of the control lever 103. Due to the spiral-shaped line assemblies 107 and 109, the control lever 103 can be moved up to a deflection of 25° with a constant or minimal deflection.

Figure 4:
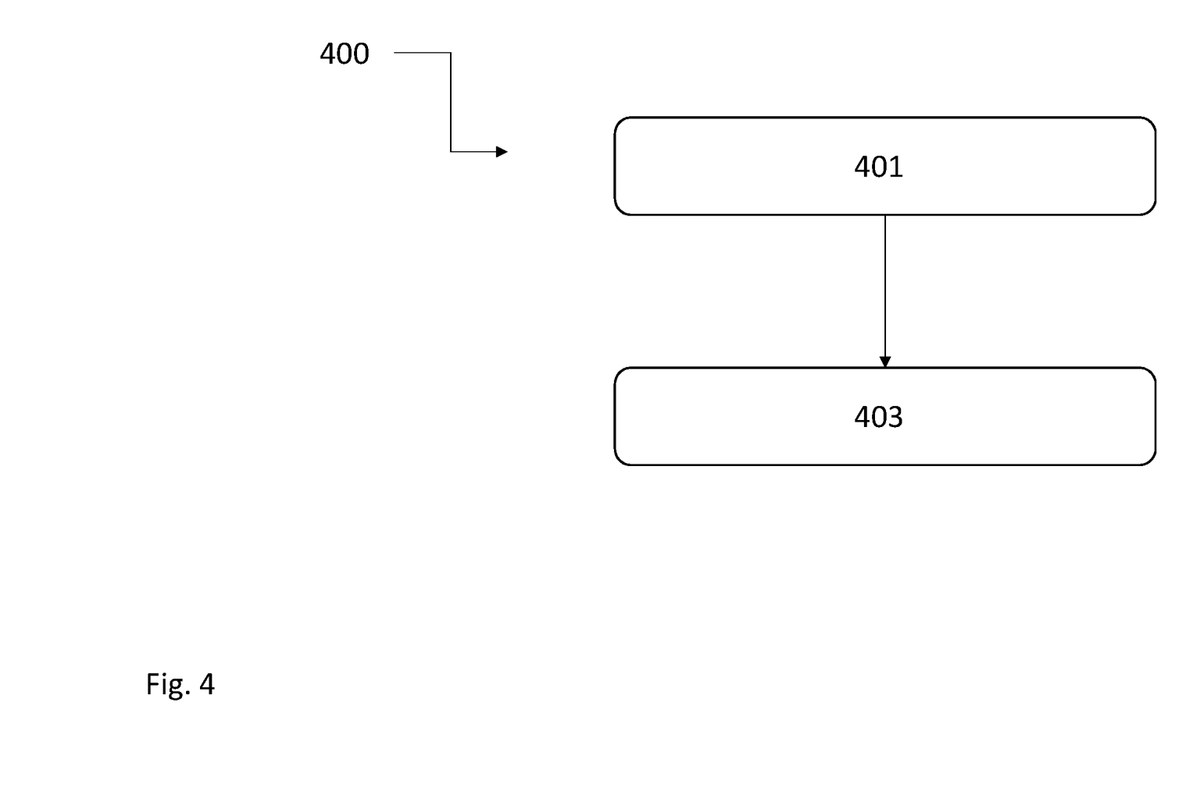

FIG. 4 shows a manufacturing method 400. The manufacturing method 400 comprises a provision step 401, in which a control lever pivotably mounted around a pivot point, a plurality of control lines for connecting the control lever to a control unit and a receptacle for picking up the control lines are provided. Furthermore, the manufacturing method 400 comprises a connection step 403, in which respective control lines of the plurality of control lines are laid in at least a paired design consisting a first wiring harness and a second wiring harness in the direction of the receptacle, wherein the first wiring harness is laid from a first starting point in the direction of the receptacle and the second wiring harness is laid from a second starting point in the direction of the receptacle. The first wiring harness is connected to a first connection point with the receptacle and the second wiring harness is connected to the receptacle at a second connection point. The first connection point and the second connection point are arranged at a distance on a straight connecting line and the connecting line runs through a central axis of the control lever.

Figure 5:
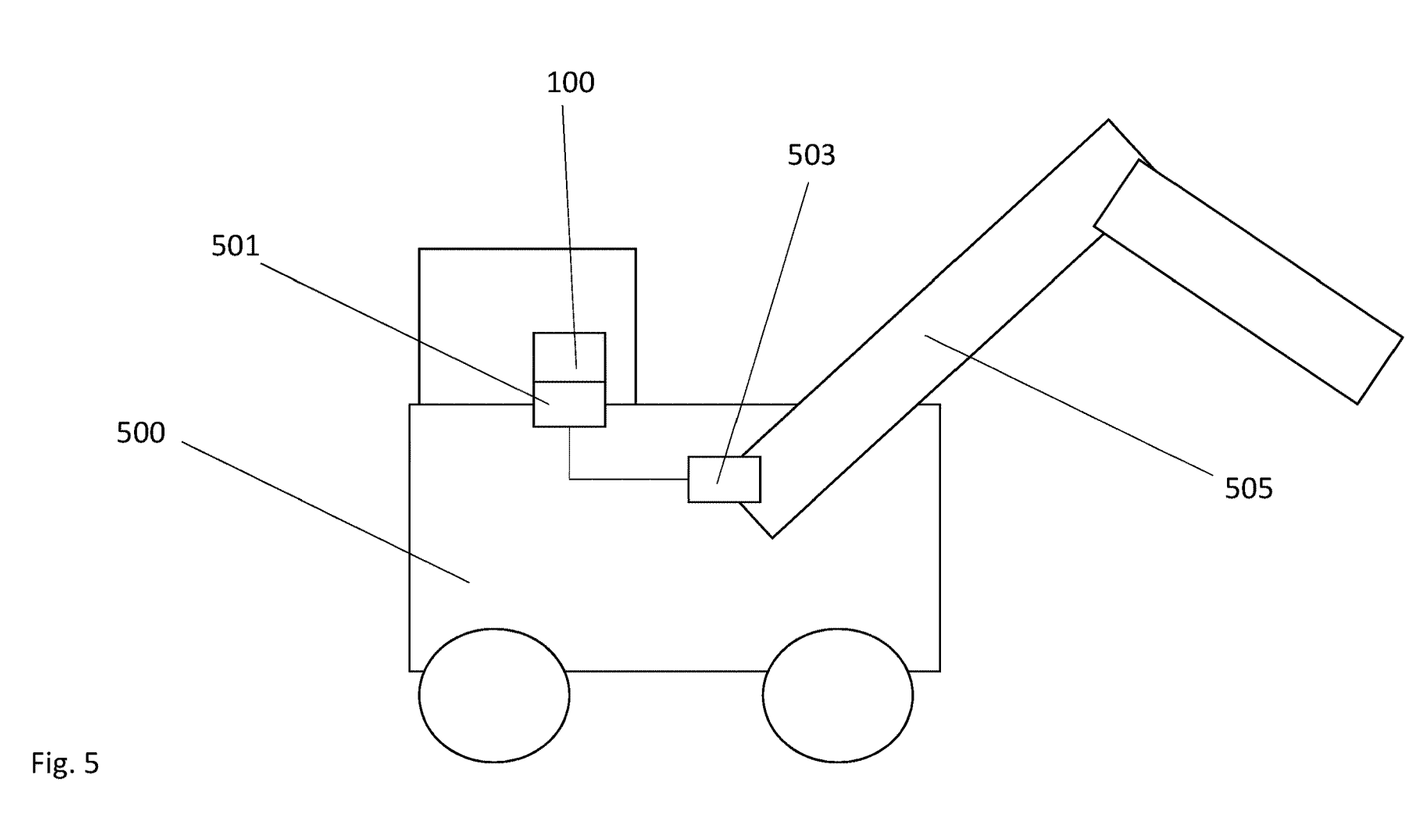
FIG. 5: a schematic illustration of a possible embodiment of the machine according to the invention.

FIG. 5 shows a machine 500. The machine 500 is an excavator or as shown a tractor and comprises the operating element 100 according to FIG. 1. The operating element 100 is in the present case by means of an interface 501 with a mating interface 503 of the machine 500 communicatively connected, so that by means of the operating element 100 provided control commands via the interface 501 to the mating interface 503 and finally a control unit, such as an excavator arm 505 of the machine 500 are transmitted.

The invention claimed is:

1. An operating element for operating a machine by an operator, wherein the operating element comprises:
   a control lever pivotably mounted around a pivot point,
   a first wiring harness and a second wiring harness each containing a plurality of control lines for connecting the control lever to a control unit,
   a receptacle for receiving the control lines,
   wherein the first wiring harness and the second wiring harness run spirally around a central axis of the control lever to the receptacle, wherein the first wiring harness and the second wiring harness differ or do not differ in their sense of rotation,
   wherein the first wiring harness runs from a first starting point to the receptacle and the second wiring harness runs from a second starting point to the receptacle,
   wherein the first starting point and the second starting point are arranged separately from the receptacle,
   wherein the first wiring harness is connected to the receptacle at a first connection point,
   wherein the second wiring harness is connected to the receptacle at a second connection point,
   wherein the first connection point and the second connection point are arranged separately from each other on a straight connecting line,
   wherein the straight connecting line runs through the central axis of the control lever.

2. An operating element according to claim 1, wherein the central axis runs between an upper end and a lower end of the control lever and through the pivot point.

3. An operating element according to claim 1, wherein the straight connecting line runs through the pivot point.

4. An operating element according to claim 1, wherein the control lines comprise electrical cables, pneumatic lines, or hydraulic lines.

5. An operating element according to claim 4, wherein the control lines include pneumatic lines and/or hydraulic lines.

6. An operating element according to claim 1, wherein the first starting point and the second starting point are arranged at a distance on a starting point line connecting the first starting point and the second starting point, wherein the starting point line runs through the central axis of the control lever.

7. An operating element according to claim 1, wherein a torque acting via the first wiring harness on the control lever corresponds to a torque acting via the second wiring harness on the control lever, so that respective torques acting via the control lines on the control lever compensate each other.

8. An operating element according to claim 1, wherein the first wiring harness comprises a plurality of electrical control lines, and the second wiring harness comprises a plurality of electrical control lines, which are encased together.

9. An operating element according to claim 8, wherein the electrical control lines of the first wiring harness are encased together with a single common sheathing, and the electrical control lines of the second wiring harness are encased together with a single common sheathing.

10. An operating element according to claim 1, wherein the first wiring harness is longer than a first straight line between the first starting point and the first connection point, and the second wiring harness is longer than a second line between the second starting point and the second connection point.

11. A machine, comprising an operating element according to claim 1.

12. A machine according to claim 11, wherein the machine is an excavator.

13. A manufacturing method for the manufacture of an operating element, wherein the manufacturing method comprises:
- a provisioning step in which a control lever pivotably mounted around a pivot point, a first wiring harness and a second wiring harness each containing a plurality of control lines for connecting the control lever to a control unit and a receptacle for receiving the control lines are provided,
- a connection step,
- wherein the first wiring harness is laid from a first starting point in a direction of the receptacle and the second wiring harness is laid from a second starting point in the direction of the receptacle, and the first wiring harness is connected to the receptacle at a first connection point, and the second wiring harness is connected to the receptacle at a second connection point,
- wherein the first connection point and the second connection point are arranged at a distance on a straight connecting line, wherein the connecting line runs through a central axis of the control lever, and
- wherein the first wiring harness and the second wiring harness are laid spirally around the central axis of the control lever to the receptacle, wherein the first wiring harness and the second wiring harness differ or do not differ in their sense of rotation.

* * * * *